United States Patent
Datema et al.

(10) Patent No.: US 12,365,544 B2
(45) Date of Patent: Jul. 22, 2025

(54) COMPOSITE CONCRETE CHUTE

(71) Applicant: Oshkosh Corporation, Oshkosh, WI (US)

(72) Inventors: Bryan S. Datema, Rochester, MN (US); Clint Glunz, Rochester, MN (US); Chad Jennings, Oshkosh, WI (US); Jarud Hoefker, Dodge Center, MN (US)

(73) Assignee: Oshkosh Corporation, Oshkosh, WI (US)

( * ) Notice: Subject to any disclaimer, the term of this patent is extended or adjusted under 35 U.S.C. 154(b) by 913 days.

(21) Appl. No.: 17/532,607

(22) Filed: Nov. 22, 2021

(65) Prior Publication Data

US 2022/0162004 A1     May 26, 2022

Related U.S. Application Data

(60) Provisional application No. 63/117,296, filed on Nov. 23, 2020.

(51) Int. Cl.
| | |
|---|---|
| B65G 11/16 | (2006.01) |
| B28C 5/42 | (2006.01) |
| B32B 1/00 | (2024.01) |
| B32B 3/06 | (2006.01) |
| B32B 3/30 | (2006.01) |
| B32B 15/08 | (2006.01) |
| B60P 3/16 | (2006.01) |
| B62D 21/02 | (2006.01) |
| B62D 27/02 | (2006.01) |

(52) U.S. Cl.
CPC .......... B65G 11/166 (2013.01); B28C 5/4248 (2013.01); B32B 1/00 (2013.01); B32B 3/06 (2013.01); B32B 3/30 (2013.01); B32B 15/08 (2013.01); B60P 3/16 (2013.01); B62D 21/02 (2013.01); B62D 27/02 (2013.01); *B32B 2250/40* (2013.01); *B32B 2605/00* (2013.01)

(58) Field of Classification Search
CPC ..... B28C 5/0818; B28C 5/4248; B28C 7/168; B65G 11/166
USPC ........................................................ 280/769
See application file for complete search history.

(56) References Cited

U.S. PATENT DOCUMENTS

| | | | |
|---|---|---|---|
| 6,367,606 B1* | 4/2002 | Skalla ................. | B65G 11/166 193/6 |
| 6,845,858 B2* | 1/2005 | McVay ................. | B65G 11/18 193/6 |
| 6,918,481 B2* | 7/2005 | Quigley ................ | B65G 11/18 193/6 |
| 7,578,379 B2 | 8/2009 | Gillmore et al. | |
| 7,648,015 B2 | 1/2010 | Gillmore et al. | |
| 7,931,397 B2 | 4/2011 | Lindblom et al. | |
| 8,182,194 B2 | 5/2012 | Pruteanu et al. | |
| 8,613,543 B2 | 12/2013 | Lindblom et al. | |
| 8,646,965 B2 | 2/2014 | Datema et al. | |
| D737,866 S | 9/2015 | Datema et al. | |
| 9,387,985 B2 | 7/2016 | Gillmore et al. | |

(Continued)

*Primary Examiner* — Elizabeth Insler
(74) *Attorney, Agent, or Firm* — Foley & Lardner LLP

(57) ABSTRACT

A composite chute for a commercial vehicle includes a metal frame, and a pair of plastic sheets. The metal frame assembly defines a longitudinal axis. The pair of plastic sheets extend along the longitudinal axis and positioned on either side of the metal frame assembly. The metal frame assembly is sandwiched between the pair of plastic sheets.

20 Claims, 17 Drawing Sheets

(56) References Cited

U.S. PATENT DOCUMENTS

| | | | |
|---|---|---|---|
| D772,306 S | 11/2016 | Datema et al. | |
| 9,579,969 B2 | 2/2017 | Crist et al. | |
| 9,694,671 B2 | 7/2017 | Wildgrube et al. | |
| 9,845,191 B2 | 12/2017 | Schwartz et al. | |
| 9,925,690 B2 * | 3/2018 | Morrissette | B65G 11/026 |
| 10,035,648 B2 | 7/2018 | Haddick et al. | |
| 10,106,032 B2 | 10/2018 | Crist et al. | |
| 10,351,340 B2 | 7/2019 | Haddick et al. | |
| 10,414,067 B2 | 9/2019 | Datema et al. | |
| 10,513,392 B2 | 12/2019 | Haddick et al. | |
| 10,618,405 B2 | 4/2020 | Crist et al. | |
| 10,800,605 B2 | 10/2020 | Rocholl et al. | |
| 10,843,379 B2 | 11/2020 | Rocholl et al. | |
| 10,901,409 B2 | 1/2021 | Datema et al. | |
| 10,940,610 B2 | 3/2021 | Clifton et al. | |
| 10,987,829 B2 | 4/2021 | Datema et al. | |
| 10,994,929 B2 | 5/2021 | Haddick et al. | |
| 11,027,606 B2 | 6/2021 | Wildgrube et al. | |
| 2017/0297425 A1 | 10/2017 | Wildgrube et al. | |
| 2019/0344475 A1 | 11/2019 | Datema et al. | |
| 2020/0230841 A1 | 7/2020 | Datema et al. | |
| 2020/0230842 A1 | 7/2020 | Datema et al. | |
| 2020/0231035 A1 | 7/2020 | Crist et al. | |
| 2020/0399058 A1 | 12/2020 | Rocholl et al. | |
| 2021/0039719 A1 | 2/2021 | Datema et al. | |
| 2021/0069934 A1 | 3/2021 | Rocholl et al. | |
| 2021/0124347 A1 | 4/2021 | Datema et al. | |
| 2021/0162630 A1 | 6/2021 | Clifton et al. | |
| 2021/0213642 A1 | 7/2021 | Datema et al. | |
| 2021/0214156 A1 | 7/2021 | Haddick et al. | |
| 2021/0229320 A1 | 7/2021 | Datema et al. | |
| 2021/0229321 A1 | 7/2021 | Datema et al. | |
| 2021/0237311 A1 | 8/2021 | Datema | |
| 2021/0237312 A1 | 8/2021 | Datema et al. | |
| 2021/0252969 A1 | 8/2021 | Wildgrube et al. | |
| 2021/0276222 A1 | 9/2021 | Datema | |
| 2021/0339949 A1 | 11/2021 | Rocholl et al. | |
| 2021/0345062 A1 | 11/2021 | Koga et al. | |
| 2021/0394394 A1 | 12/2021 | Datema et al. | |

* cited by examiner

COMPOSITE CONCRETE CHUTE

CROSS-REFERENCE TO RELATED PATENT APPLICATION

This application claims the benefit of and priority to U.S. Provisional Patent No. 63/117,296, filed Nov. 23, 2020, the entire disclosure of which is incorporated by reference herein.

BACKGROUND

The present disclosure relates to chassis for commercial vehicles. More particularly, the present disclosure relates to chutes for a concrete mixing commercial vehicle.

SUMMARY

One embodiment of the present disclosure is a composite chute for a commercial vehicle. The composite chute includes a metal frame, and a pair of plastic sheets. The metal frame assembly defines a longitudinal axis. The pair of plastic sheets extend along the longitudinal axis and positioned on either side of the metal frame assembly. The metal frame assembly is sandwiched between the pair of plastic sheets.

The pair of plastic sheets are bonded with each other with the metal frame assembly positioned between the pair of plastic sheets. The metal frame assembly includes a first structural member, a second structural member, and multiple elongated members. The first structural member has an arcuate shape and positioned at a first end of the composite chute. The second structural member has an arcuate shape and positioned at a second end of the composite chute. The elongated members extend between the first structural member and the second structural member along the longitudinal axis and are fixedly coupled with the first structural member and the second structural member.

The pair of plastic sheets include a first plastic sheet and a second plastic sheet. The first plastic sheet defines a concave surface of the composite chute, the concave surface configured to guide a slurry material along the composite chute.

The first plastic sheet is positioned on a first side of the metal frame assembly and the second plastic sheet is positioned on a second side of the metal frame assembly. The second plastic sheet includes multiple ribs extending in a longitudinal direction along the second plastic sheet. Each of the ribs define a channel configured to receive a corresponding one of the plurality of elongated members of the metal frame assembly. The pair of plastic sheets are manufactured from a thermoplastic material.

Another embodiment of the present disclosure is a concrete mixer vehicle. The concrete mixer vehicle includes a chassis, multiple tractive elements, a mixer drum, and a composite chute. The tractive elements and the mixer drum are coupled with the chassis. The composite chute is configured to facilitate discharge of a slurry material from the mixer drum. The composite chute includes a metal frame assembly, and a pair of plastic sheets. The metal frame assembly defines a longitudinal axis. The pair of plastic sheets extend along the longitudinal axis and positioned on either side of the metal frame assembly. The metal frame assembly is sandwiched between the pair of plastic sheets.

The pair of plastic sheets are bonded with each other with the metal frame assembly positioned between the pair of plastic sheets. The metal frame assembly includes a first structural member having an arcuate shape and positioned at a first end of the composite chute, a second structural member having an arcuate shape and positioned at a second end of the composite chute, and multiple elongated members that extend between the first structural member and the second structural member along the longitudinal axis and are fixedly coupled with the first structural member and the second structural member.

The pair of plastic sheets include a first plastic sheet and a second plastic sheet. The first plastic sheet defines a concave surface of the composite chute, the concave surface configured to guide a slurry material along the composite chute.

The first plastic sheet is positioned on a first side of the metal frame assembly and the second plastic sheet is positioned on a second side of the metal frame assembly. The second plastic sheet includes multiple ribs extending in a longitudinal direction along the second plastic sheet. Each of the multiple ribs define a channel configured to receive a corresponding one of the elongated members of the metal frame assembly. The pair of plastic sheets are manufactured from a thermoplastic material.

Another embodiment of the present disclosure is a composite chute for a concrete mixer assembly. The composite chute includes a metal frame assembly, and a single plastic sheet positioned on a top side of the metal frame assembly.

The plastic sheet is bonded with the metal frame assembly. The metal frame assembly includes a first structural member, a second structural member, multiple elongated members, and an intermediate structural member. The first structural member has an arcuate shape and is positioned at a first end of the composite chute. The second structural member has an arcuate shape and is positioned at a second end of the composite chute. The multiple elongated members extend between the first structural member and the second structural member in a longitudinal direction and are fixedly coupled with the first structural member and the second structural member. The intermediate structural member has an arcuate shape and is positioned between the first end and the second end of the composite chute, the intermediate structural member fixedly coupled with each of the plurality of elongated members.

The plastic sheet defines a concave surface, the concave surface configured to guide a slurry material along the composite chute. The metal frame assembly further includes a pair of hooks positioned on the metal frame assembly proximate a first end of the composite chute. The metal frame assembly further includes a pair of coupling members positioned proximate a second end of the composite chute, the coupling members configured to interlock with a pair of hooks of an adjacent composite chute.

The first plastic sheet is positioned on a first side of the metal frame assembly and the second plastic sheet is positioned on a second side of the metal frame assembly. The second plastic sheet includes multiple ribs extending in a longitudinal direction along the second plastic sheet. Each of the plurality of ribs define a channel configured to receive a corresponding one of the plurality of elongated members of the metal frame assembly. The pair of plastic sheets are manufactured from a thermoplastic material.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a composite or hybrid concrete chute incudes a frame assembly and a pair of plastic sheets. The frame assembly includes structural components or collars that are positioned a distance apart and include several elongated members that fixedly couple with the structural components and extend between the structural components. The structural components and the elongated members can be manufactured from aluminum or steel. The plastic sheets are molded to and fixedly couple with the frame assembly (e.g., the elongated members and the structural components) and/or with each other. The plastic sheets can be thermoformed and bonded with each other, with the frame assembly sandwiched in between, thereby reducing a need to fasten or mechanically couple the plastic sheets with each other and/or with the frame assembly. Advantageously, the composite or hybrid concrete chute includes both metallic components (e.g., the aluminum or steel frame assembly) and plastic components (e.g., the pair of plastic sheets) to facilitate reduced weight and improved durability.

Concrete Mixing Truck

Figure 1:
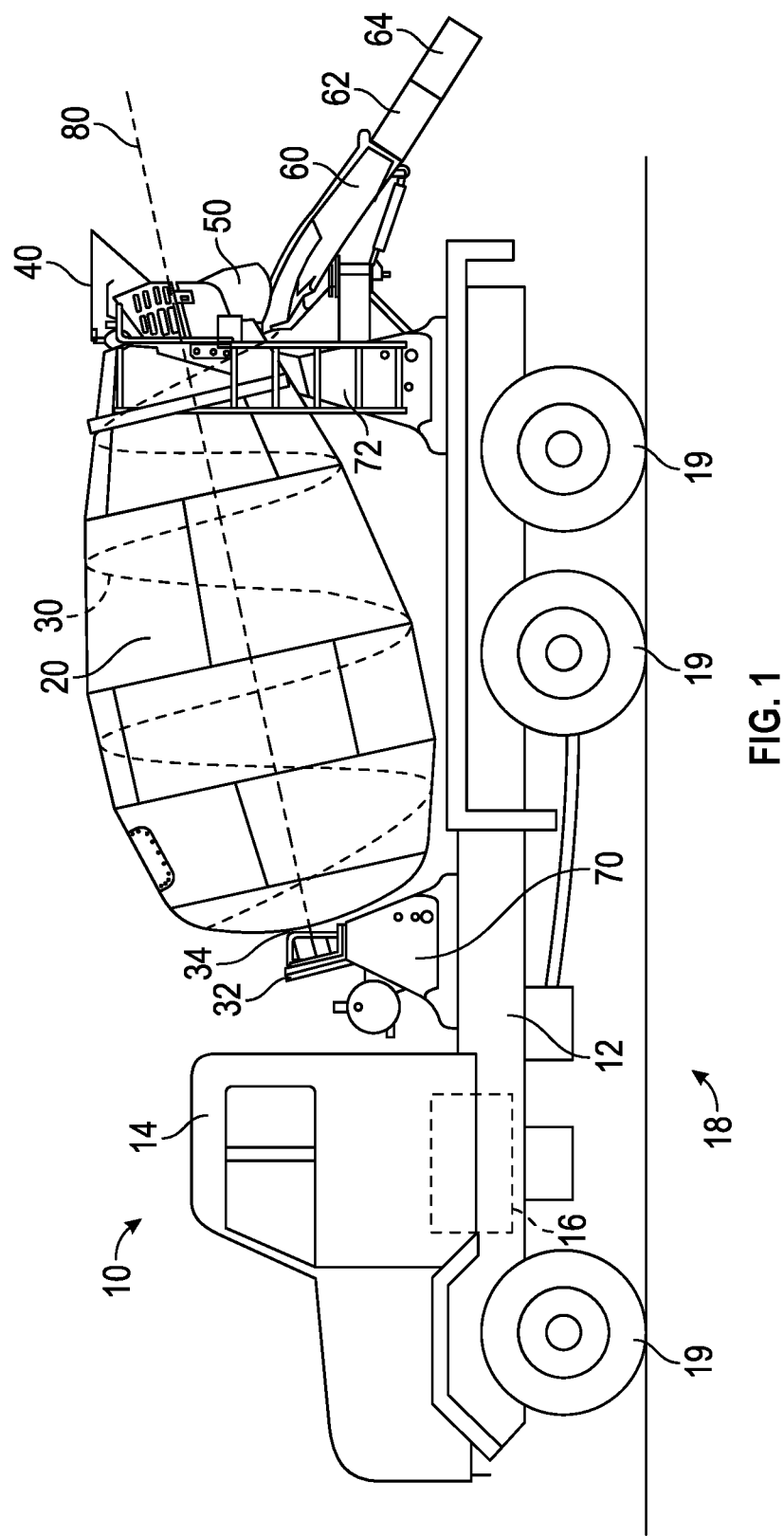
FIG. 1 is a schematic diagram of a concrete mixing truck, according to an exemplary embodiment.
Figure 2:
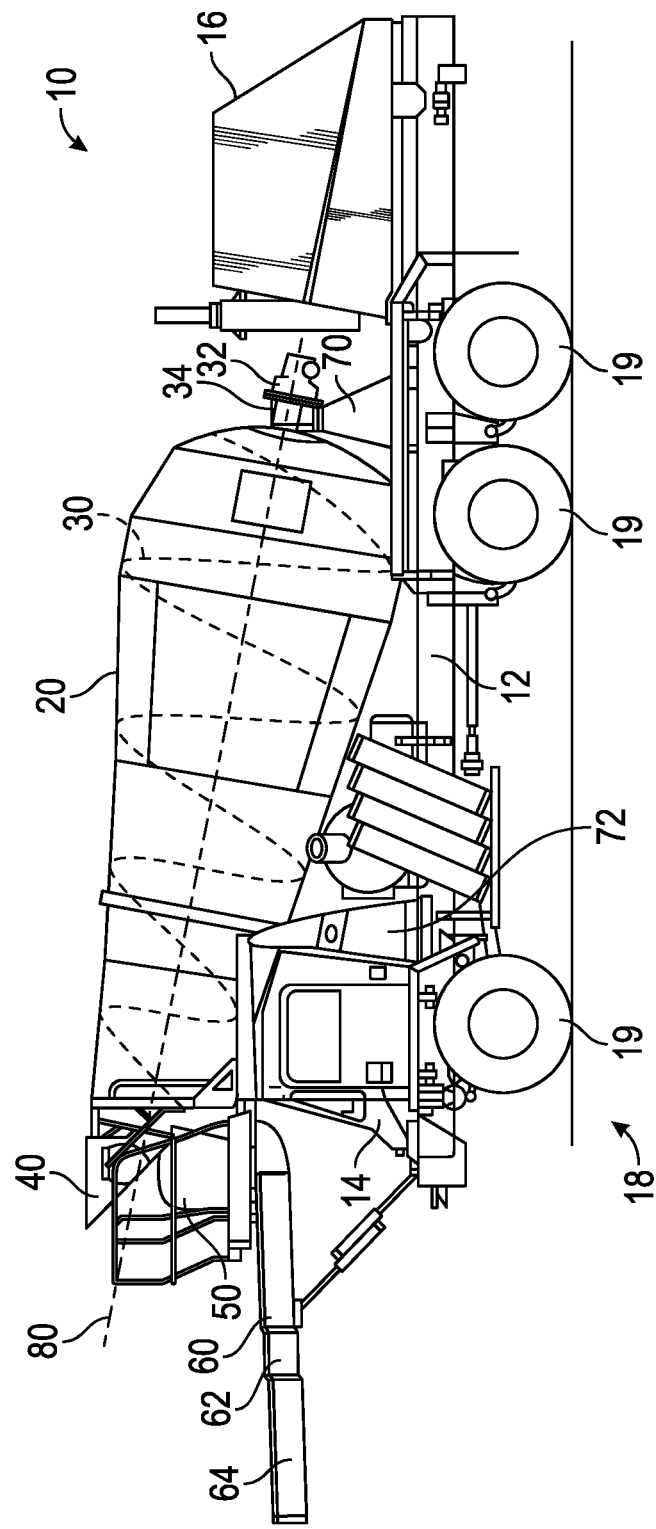
FIG. 2 is a schematic diagram of concrete mixing truck, according to another exemplary embodiment.

According to the exemplary embodiments shown in FIGS. 1 and 2, a vehicle, shown as a concrete mixing truck 10, includes a drum assembly, shown as a mixing drum 20. As shown in FIG. 1, the concrete mixing truck 10 is configured as a rear-discharge concrete mixing truck. In other embodiments, such as the embodiment shown in FIG. 2, the concrete mixing truck 10 is configured as a front-discharge concrete mixing truck. As shown in FIG. 1, the concrete mixing truck 10 includes a chassis, shown as frame 12, and a cabin, shown as cab 14, coupled to the frame 12 (e.g., at a front end thereof, etc.). The mixing drum 20 is coupled to the frame 12 and disposed behind the cab 14 (e.g., at a rear end thereof, etc.), according to the exemplary embodiment shown in FIG. 1. In other embodiments, such as the embodiment shown in FIG. 2, at least a portion of the mixing drum 20 extends beyond the front of the cab 14. The cab 14 may include various components to facilitate operation of the concrete mixing truck 10 by an operator (e.g., a seat, a steering wheel, hydraulic controls, a control panel, a control device, a user interface, switches, buttons, dials, etc.).

The concrete mixing truck 10 also includes a prime mover or primary driver, shown as engine 16. For example, the engine 16 may be coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

The concrete mixing truck 10 may also include a transmission that is coupled to the engine 16. The engine 16 produces mechanical power (e.g., due to a combustion reaction, etc.) that may flow into the transmission. The concrete mixing truck 10 may include a vehicle drive system 18 that is coupled to the engine 16 (e.g., through the transmission). The vehicle drive system 18 may include drive shafts, differentials, and other components coupling the transmission with a ground surface to move the concrete mixing truck 10. The concrete mixing truck 10 may also include a plurality of tractive elements, shown as wheels 19, that engage a ground surface to move the concrete mixing truck 10. In one embodiment, at least a portion of the mechanical power produced by the engine 16 flows through the transmission and into the vehicle drive system 18 to power at least some of the wheels 19 (e.g., front wheels, rear wheels, etc.). In one embodiment, energy (e.g., mechanical energy, etc.) flows along a power path defined from the engine 16, through the transmission, and to the vehicle drive system 18.

As shown in FIGS. 1-2 and 11-13, the mixing drum 20 includes a mixing element (e.g., fins, etc.), shown as a mixing element 30, positioned within the interior (e.g., an internal volume) of the mixing drum 20. The mixing element 30 may be configured to (i) mix the contents of mixture within the mixing drum 20 when the mixing drum 20 is rotated (e.g., by a drum drive system) in a first direction (e.g., counterclockwise, clockwise, etc.) and (ii) drive the mixture within the mixing drum 20 out of the mixing drum 20 (e.g., through a chute, etc.) when the mixing drum 20 is rotated (e.g., by a drum drive system including a drum driver 32) in an opposing second direction (e.g., clockwise, counterclockwise, etc.). The concrete mixing truck 10 also includes an inlet (e.g., hopper, etc.), shown as charge hopper 40, a connecting structure, shown as discharge hopper 50, and an outlet, shown as chute 60. The charge hopper 40 is fluidly coupled with the mixing drum 20, which is fluidly coupled with the discharge hopper 50, which is fluidly coupled with the chute 60. In this way, wet concrete may flow into the mixing drum 20 from the charge hopper 40 and may flow out of the mixing drum 20 into the discharge hopper 50 and then into the chute 60 to be dispensed. According to an exemplary embodiment, the mixing drum 20 is configured to receive a mixture, such as a concrete mixture (e.g., cementitious material, aggregate, sand, rocks, etc.), through the charge hopper 40. The concrete mixing truck 10 can also include a folding chute 62 that is configured to extend a distance at which concrete is poured, as well as one or more extension chutes 64. The folding chute 62 may be optional. The one or more extension chutes 64 can be configured to couple with each other to extend the distance even farther.

The drum driver 32 is configured to provide mechanical energy (e.g., in a form of an output torque) to rotate the mixing drum 20. The drum driver 32 may be a hydraulic motor, an electric motor, a power take off shaft coupled to the engine 16, or another type of driver. The drum driver 32 is coupled to the mixing drum 20 by a shaft, shown as drive shaft 34. The drive shaft 34 is configured to transfer the output torque to the mixing drum 20.

Figure 3:
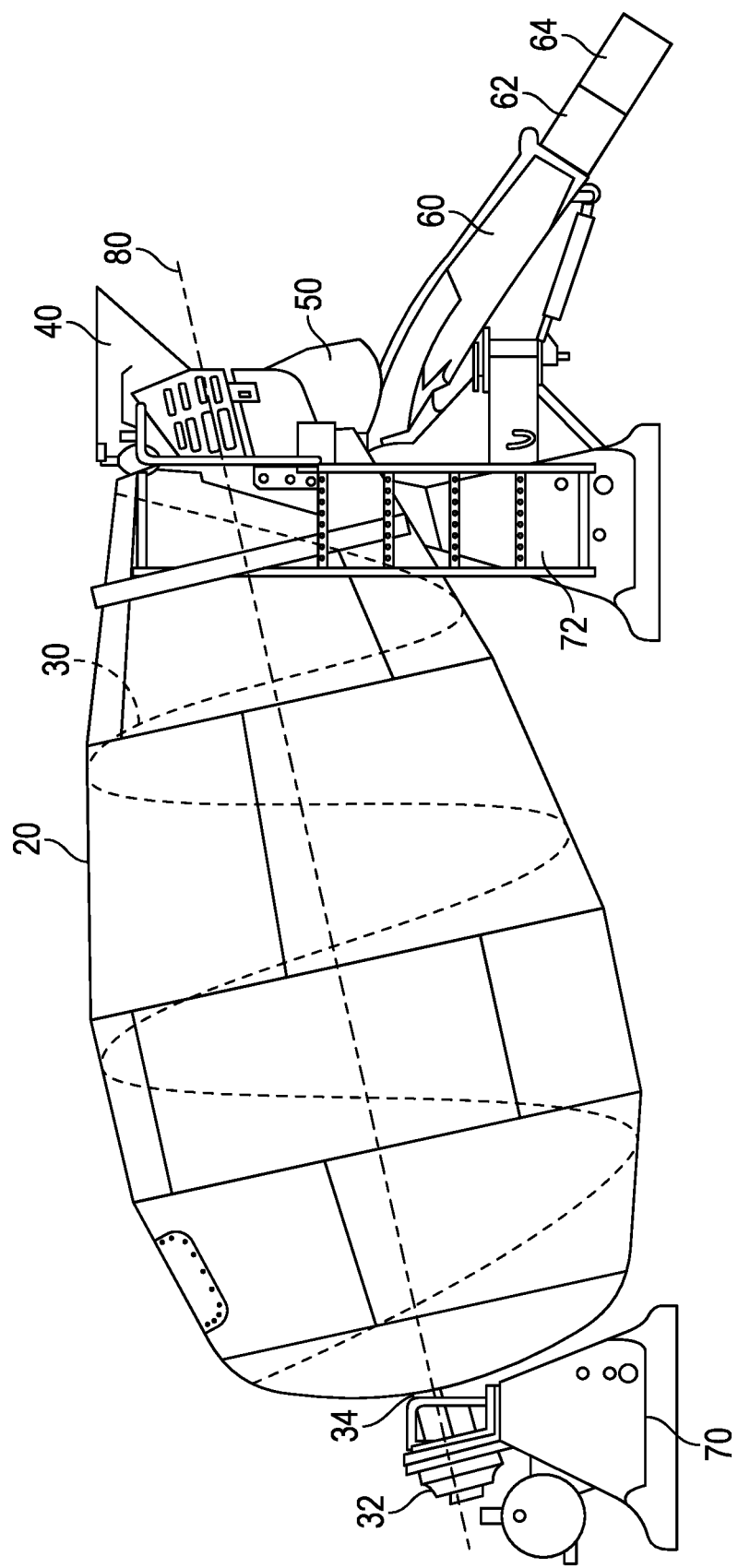
FIG. 3 is a schematic diagram of a mixing drum for a concrete mixing truck including a charge hopper, according to an exemplary embodiment.
Figure 11:
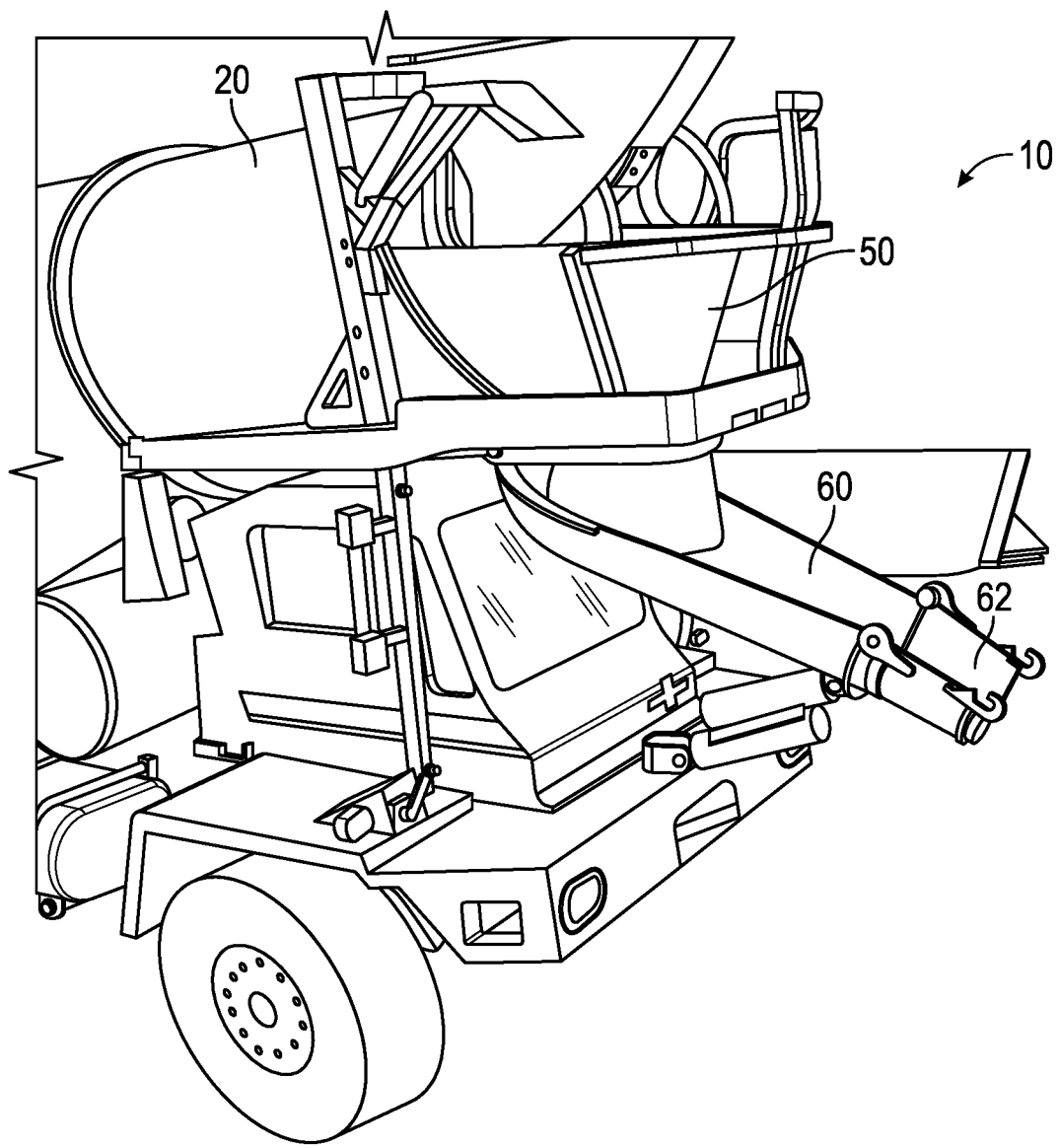
FIG. 11 is a perspective view of a portion of a model of the concrete mixing truck of FIG. 1, according to an exemplary embodiment.
Figure 12:
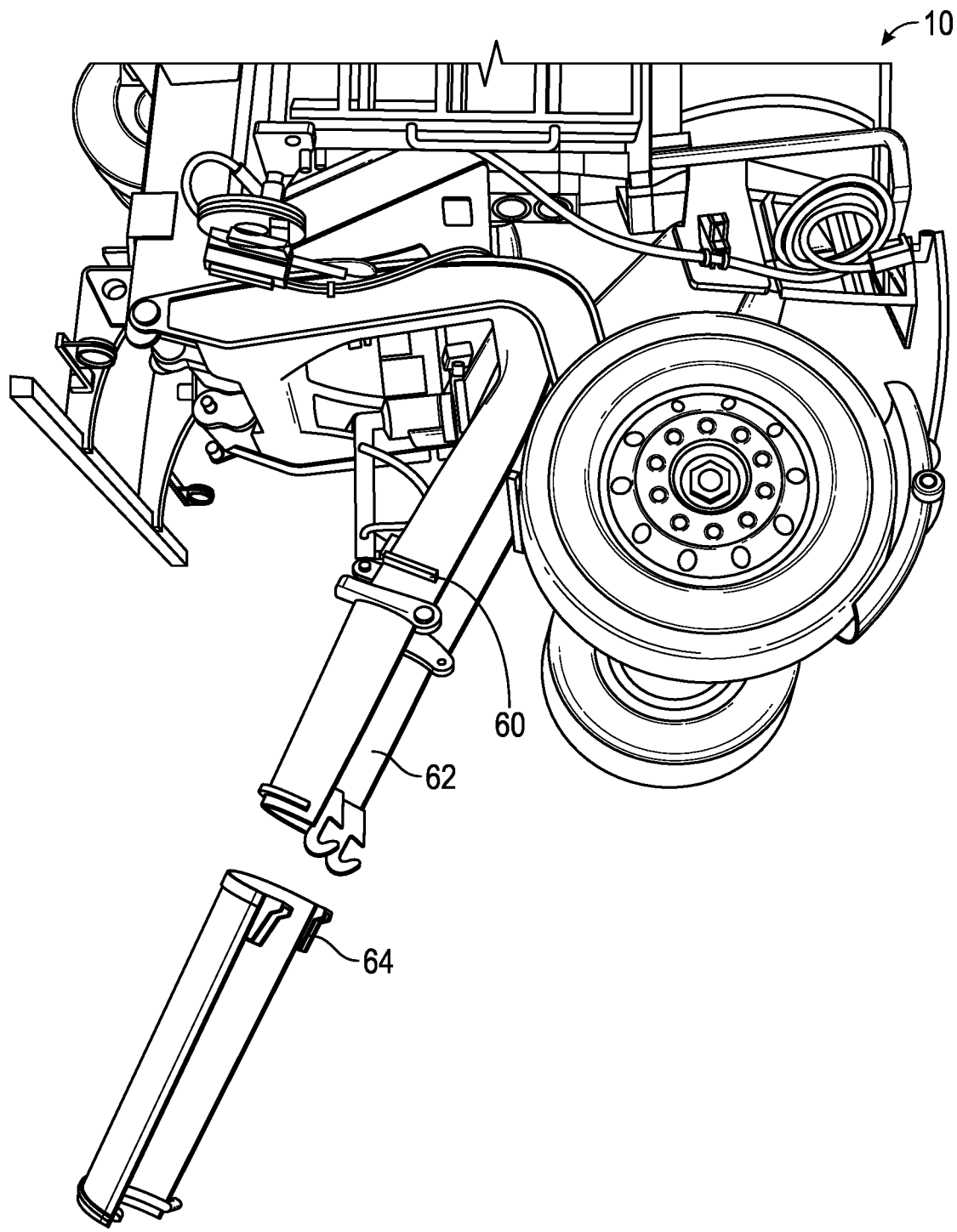
FIG. 12 is a perspective view of a portion of the model of FIG. 11, according to an exemplary embodiment.

FIGS. 3 and 11-12 illustrate a mixing drum assembly including the mixing drum 20, the mixing element 30, the drum driver 32, the charge hopper 40, the discharge hopper 50, and the chute 60 isolated from the concrete mixing truck 10. FIGS. 11-12 show a model of various portions of the concrete mixing truck 10, illustrating various features as described herein. The mixing drum 20 may be coupled to supports (e.g., pedestals, etc.), shown as pedestal 70 and pedestal 72. The pedestal 70 and the pedestal 72 may be coupled to the frame 12 of the concrete mixing truck 10. The pedestal 70 and the pedestal 72 may function to cooperatively couple (e.g., attach, secure, etc.) the mixing drum 20 to the frame 12 and facilitate rotation of the mixing drum 20 relative to the frame 12. In an alternative embodiment, such as is shown in FIG. 3, the mixing drum 20 is configured as a stand-alone mixing drum that is not coupled (e.g., fixed, attached, etc.) to a vehicle. In such an embodiment, the mixing drum 20 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIG. 1, the mixing drum 20 defines a central, longitudinal axis 80. According to an exemplary embodiment, the mixing drum 20 is selectively rotated about the longitudinal axis 80 (e.g., by the drum driver 32). The longitudinal axis 80 may be angled relative to the frame (e.g., the frame 12 of the concrete mixing truck 10) such that the longitudinal axis 80 intersects with the frame. For example, the longitudinal axis 80 may be elevated from the frame at an angle in the range of five degrees to twenty degrees. In other applications, the longitudinal axis 80 may be elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the longitudinal axis 80 to a desired or target angle (e.g., manually in response to an operator input/command, automatically according to a control scheme, etc.).

Composite Chute

Referring now to FIGS. 4-10, the extension chute 64 is shown, according to various exemplary embodiments. The extension chute 64 can be a composite chute that includes both one or more metallic members (e.g., aluminum, steel, etc.) and one or more plastic members. For example, the extension chute 64 may include a frame that is manufactured from metal materials that is sandwiched between a pair of members that are manufactured from plastic materials. Advantageously, using both metal materials and plastic materials facilitates a light weight chute.

Figure 4:
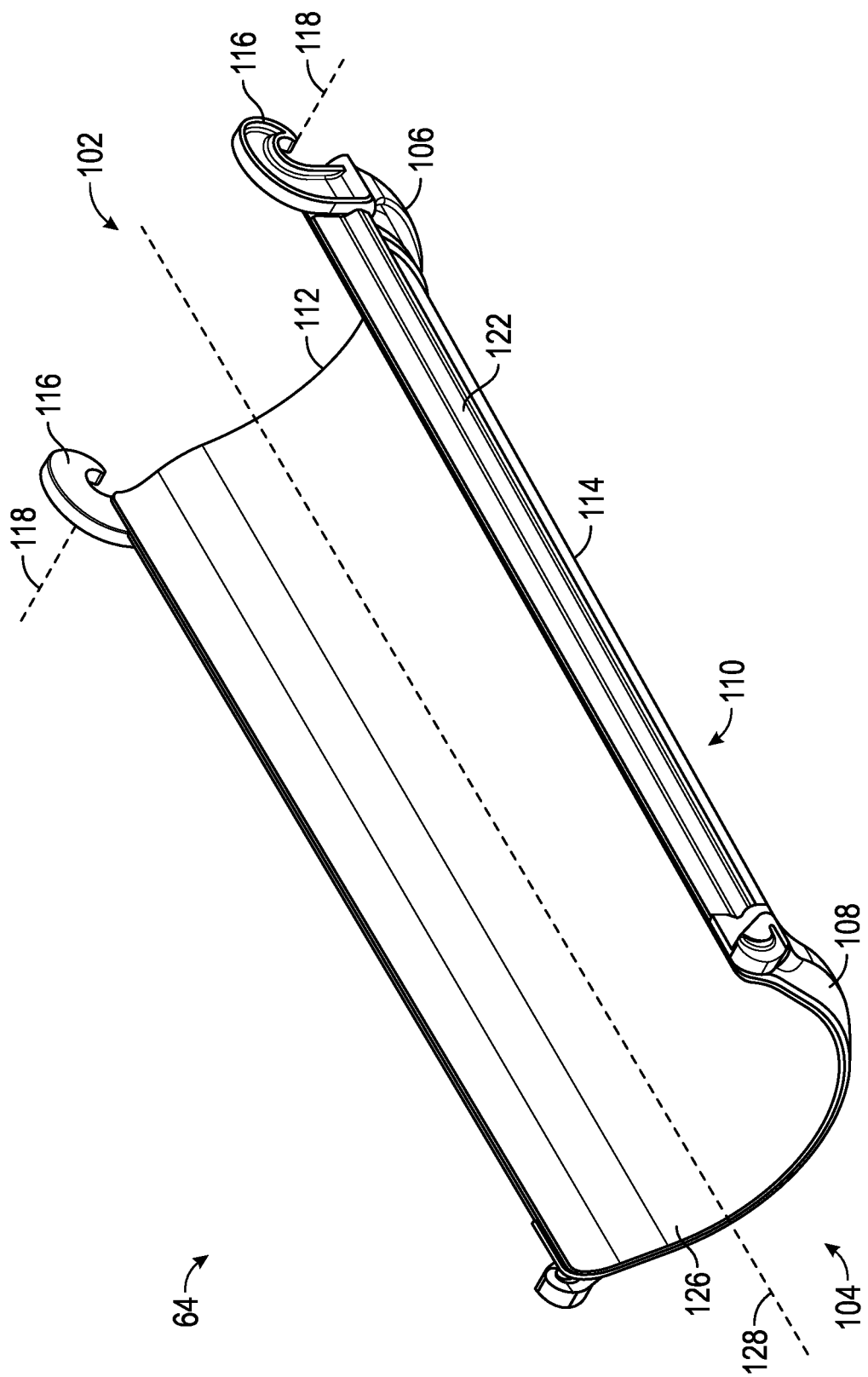
FIG. 4 is a perspective view of a composite concrete chute including a first sheet, a second sheet, and a frame, according to an exemplary embodiment.
Figure 5:
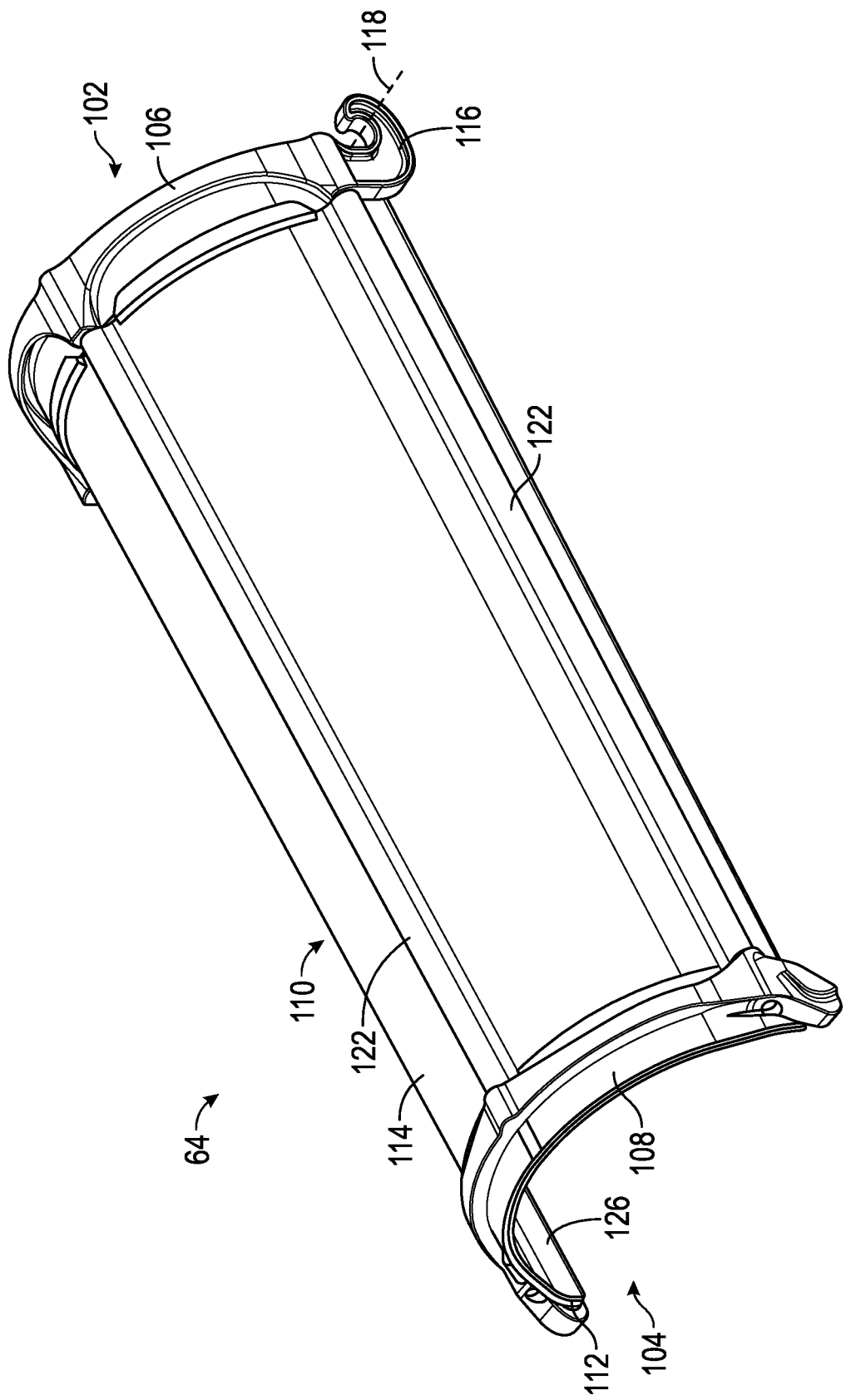
FIG. 5 is another perspective view of the composite concrete chute of FIG. 4, according to an exemplary embodiment.
Figure 6:
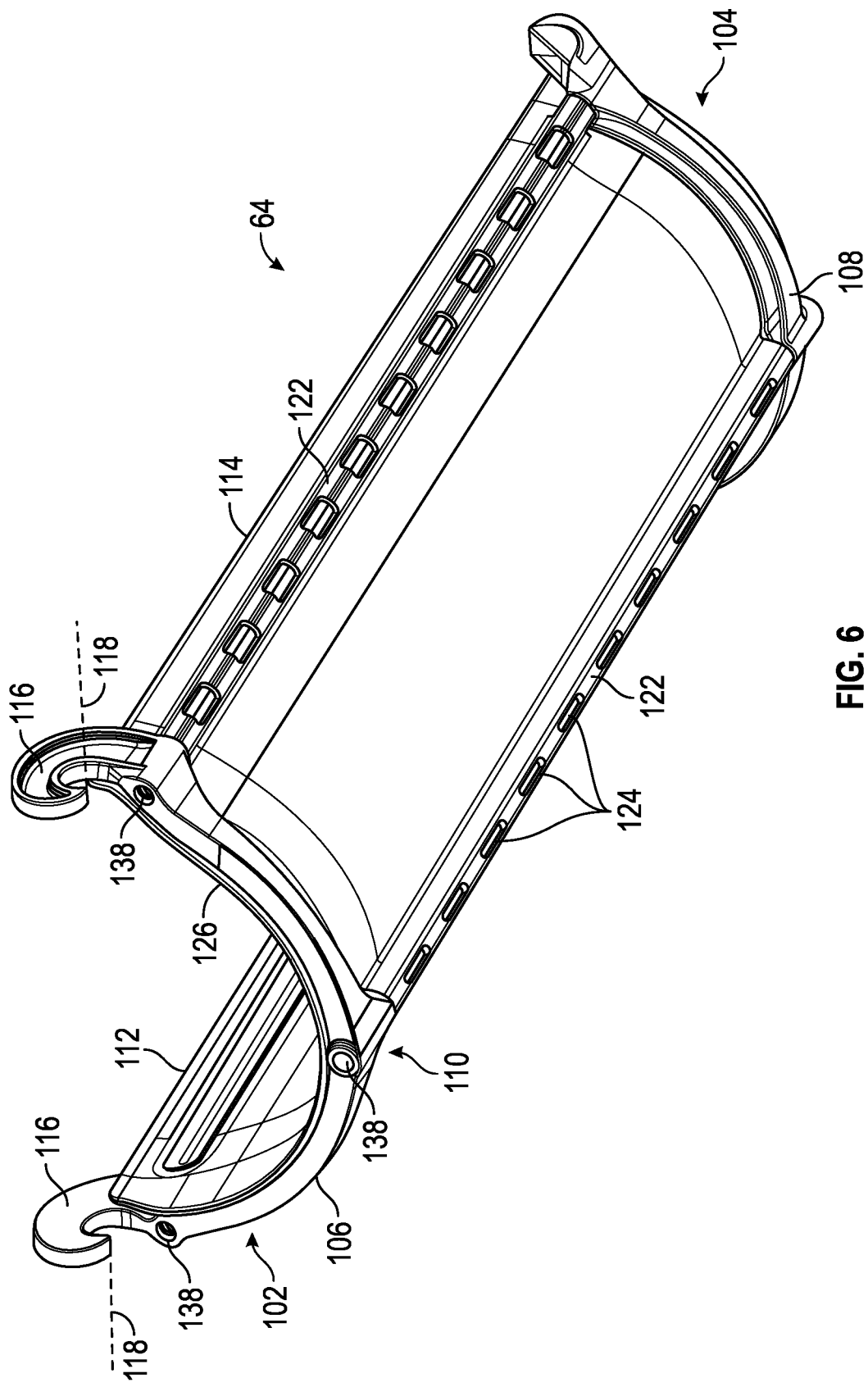
FIG. 6 is another perspective view of the composite concrete chute of FIG. 4, according to an exemplary embodiment.

Referring particularly to FIGS. 4-6, the extension chute 64 defines a first end 102 (e.g., a proximate end) and a second end 104. The first end 102 is received at the discharge hopper 50 and the second end 102 is an opposite or distal end of the extension chute 64. Concrete or a slurry material can be dispensed or output along the extension chute 64 from the first end 102 to the second end 104. The extension chute 64 facilitates output of the concrete or slurry material from the discharge hopper 50 to a work site.

The extension chute 64 includes a frame 110, a first member 112, and a second member 114. The frame 110, the first member 112, and the second member 114 extend between the first end 102 and the second end 104. The first member 112 and the second member 114 can be shell members, sheets, curved surfaces with a thickness, etc., with the frame 110 sandwiched between the first member 112 and the second member 114. The first member 112 can be a shell that has an overall arcuate or semi-circular shape. The first member 112 is an inner member that defines a concave surface 126 along which the concrete or slurry material is dispensed. In some embodiments, the concave surface 126 is the same plastic material as the first member 112. In other embodiments, the concave surface 126 includes an additional wear layer or a wear material. The second member 114 can be an outer member that is positioned on an opposite side of the frame 110 relative to the first member 112. The second member 114 can be manufactured from a same material as the first member 112 (e.g., a plastic material). In some embodiments, the first member 112 and the second member 114 are molded to interlock with or have a shape that corresponds with the frame 110 so that the frame 110 is sandwiched between and couples with the first member 112 and the second member 114.

The frame 110 can be an aluminum frame or may be manufactured from one or more metallic materials (e.g., aluminum based materials or steel). The frame 110 can provide structural support for the first member 112 and the second member 114 which are manufactured from a plastic material. Advantageously, the combination of an aluminum frame and plastic components that sandwich the aluminum frame facilitates a robust and lightweight chute. The frame 110 can be a completely metal frame (e.g., a completely aluminum or steel frame, or a completely aluminum-based or steel-based frame).

The extension chute 64 can define a longitudinal axis 128 defining a longitudinal direction. The first end 102 and the second end 104 are opposite longitudinal ends of the extension chute 64 (e.g., along the longitudinal axis 128). The extension chute 64 also includes a first structural member 106 positioned at the first end 102 of extension chute 64 (e.g., at the first end 102 of extension chute 64 along the longitudinal axis 128). The extension chute 64 also includes a second structural member 108 positioned at the second end 104 of extension chute 64. In some embodiments, the first structural member 106 and the second structural member 108 are components of the frame 110. The first structural member 106 and the second structural member 108 are manufactured from a metal (e.g., aluminum, steel, etc.). The first structural member 106 and the second structural member 108 can define outer ends of the extension chute 64. The first member 112 and the second member 114 can extend between the first structural member 106 and the second structural member 108. The first structural member 106 and the second structural member 108 can provide structural support for the first member 112 and the second member 114.

Figure 7:
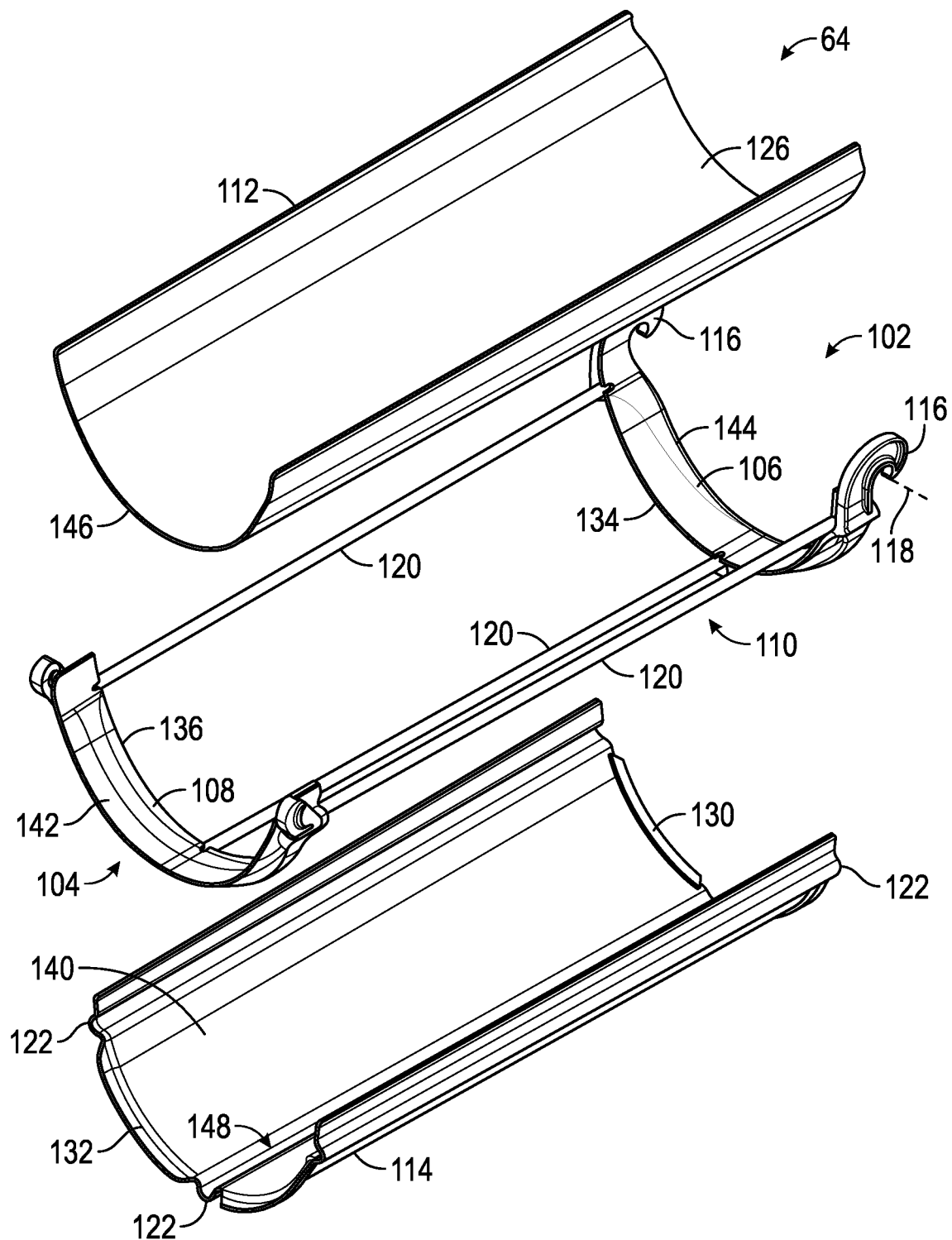
FIG. 7 is an exploded perspective view of the composite concrete chute of FIG. 4, according to an exemplary embodiment.
Figure 8:
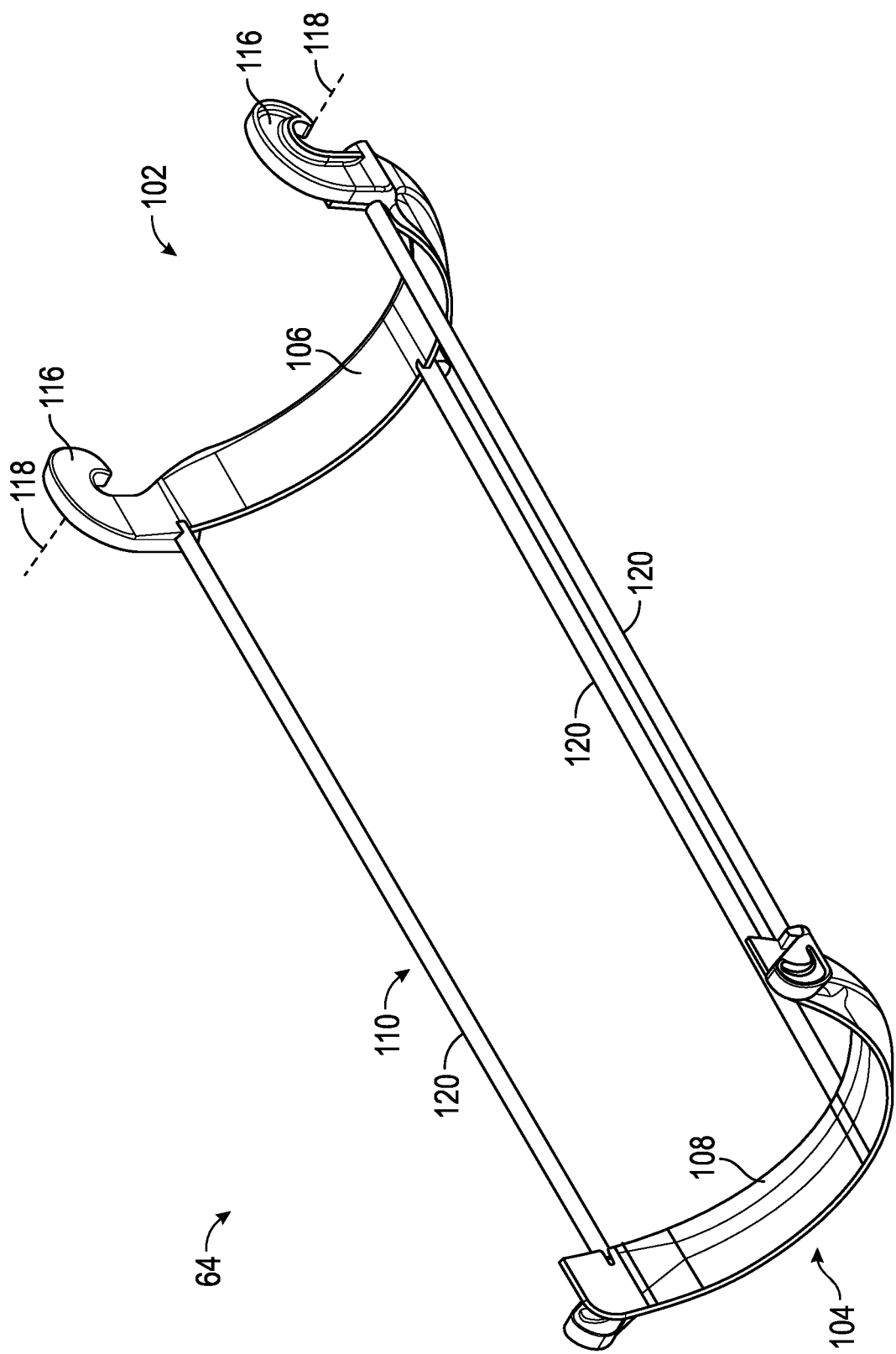
FIG. 8 is a perspective view of the frame of the composite concrete chute of FIG. 4, according to an exemplary embodiment.
Figure 9:
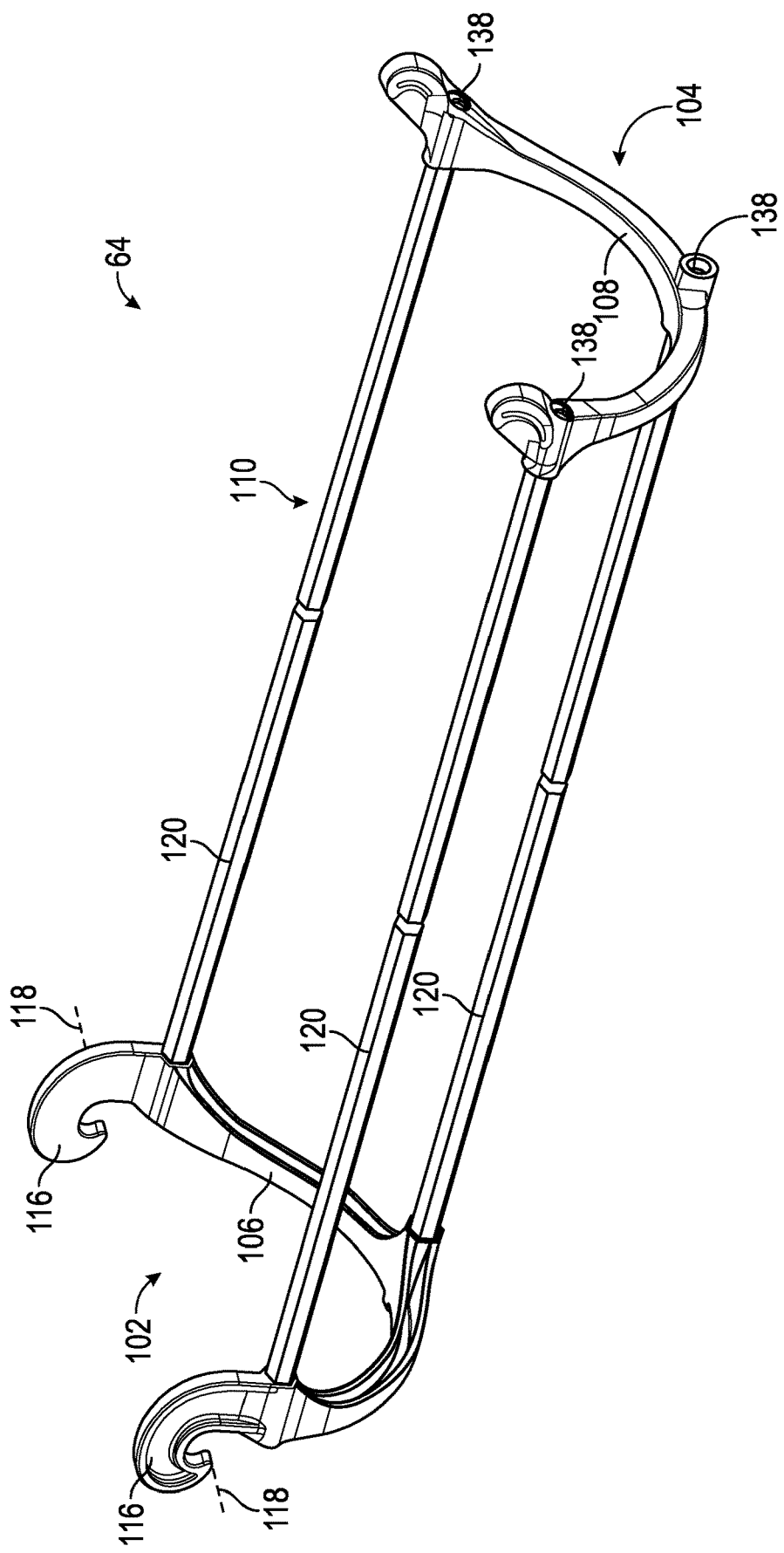
FIG. 9 is another perspective view of the frame of the composite concrete chute of FIG. 4, according to an exemplary embodiment.
Figure 10:
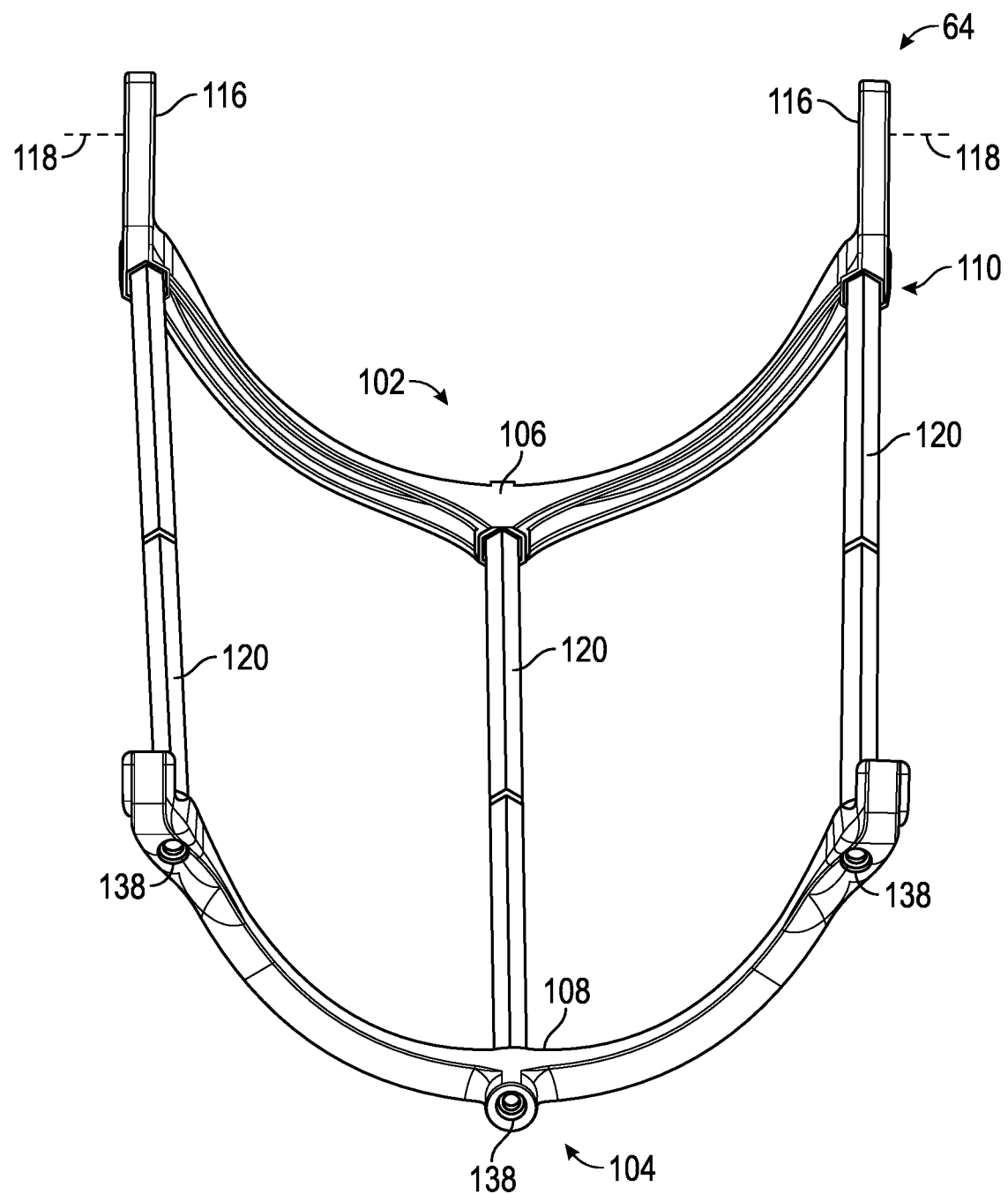
FIG. 10 is another view of the frame of the composite concrete chute of FIG. 4, according to an exemplary embodiment.

As shown in FIG. 7, the frame 110 can be sandwiched between the first member 112 and the second member 114. Referring to FIGS. 7-10, the frame 110 may be a subassembly that includes the first structural member 106 and the second structural member 108. The frame 110 also includes multiple elongated members 120 (e.g., rods, bars, beams, etc.) that extend between the first structural member 106 and the second structural member 108. The elongated members 120 can be received within corresponding apertures, holes, bores, etc., shown as receiving openings 138 (see FIGS. 6 and 10) of the first structural member 106 and the second structural member 108 and fixedly couple with the first structural member 106 and the second structural member 108. As shown in FIGS. 7-10, the frame 110 includes three of the elongated members 120 but could include less or more, each of which are spaced apart along the first structural member 106 and the second structural member 108. The elongated members 120 can have a circular cross-sectional shape (as shown in FIGS. 7-8), or a hexagonal cross-sectional shape (as shown in FIGS. 9-10), or any other cross-sectional shape.

Referring particularly to FIGS. 4-10, the first structural member 106 can include hooks 116 (e.g., coupling members, interfacing members, etc.) positioned at opposite ends of the first structural member 106. The hooks 116 are configured to facilitate a pivotal or rotatable coupling between the extension chute 64 and the chute 60 or the folding chute 62, or another extension chute 64. The hooks 116 can define an axis 118 that is substantially perpendicular with the longitudinal axis 128. The extension chute 64 can be configured to rotate or pivot about the axis 118 relative to the chute 60, the folding chute 62, or the other extension chute 64. The extension chute 64 may be driven to pivot about the axis 118 to adjust a discharge direction of extension chute 64, thereby adjusting a direction in which the concrete or slurry material is discharged, dispensed, or output. The extension chute 64 can also be driven to rotate about axis 118 of another extension chute 64 or folding chute 62 to stow the chutes when not being used to dispense concrete, and vice versa. For example, the chutes may alternatively be stored this way as opposed to being stored on pedestal 70, pedestal 72, or frame 12. This configuration may also reduce a need for an operator to remove extension chute 64 from folding chute 62 or from another extension chute 64 and to carry the chutes to their storage location, and vice versa. The extension chute 64 can also be driven to rotate about a vertical axis of the concrete mixing truck 10. In this way, the extension chute 64 can be configured to be driven to rotate about multiple axes to provide multiple degrees of freedom when discharging or output concrete or slurry material.

Referring particularly to FIGS. 4-7, the second member 114 and the first member 112 can be configured to interface or interlock with the frame 110. For example, the second member 114 includes one or more channels, grooves, kerfs, furrows, troughs, indentations, cuts, etc., shown as ribs 122. Ribs 122 are each configured to define a channel or groove 148 that receive a corresponding one of the elongated members 120 of the frame 110, when the extension chute 64 is assembled. Ribs 122 can extend along an entire longitudinal length of the second member 114. As shown in FIG. 6, the ribs 122 may also include multiple openings or apertures 124 spaced apart along an entire length of the ribs 122 to facilitate weight reduction of the extension chute 64.

Referring particularly to FIG. 7, the second member 114 can include or define an inwards facing surface 140. The inwards facing surface 140 may be a concave surface. The grooves 148 can extend along an entire longitudinal length of the second member 114. The first member 112 can also include an outwards facing surface 146. The outwards facing surface 146 can be a convex surface having a shape that corresponds to the concave inwards facing surface 140. When the extension chute 64 is assembled, the elongated members 120 are received within the grooves 148 of the ribs 122 that extend along the second member 114 and the inwards facing surface 140 of the second member 114 abuts, contacts, engages, etc., the outwards facing surface 146 of the first member 112. In some embodiments, a gap is formed between the inwards facing surface 140 and the outwards facing surface 146 when the extension chute 64 is assembled. The outwards facing surface 146 of the first member 112 may engage, abut, directly contact, etc., each of the elongated member 120 when the extension chute 64 is assembled. In this way, the elongated member 120 can be sandwiched between the first member 112 and the second member 114 and may extend along the grooves 148 defined by the ribs 122.

The first structural member 106 and the second structural member 108 can both define concave surfaces 144 and 142, respectively. The outwards facing surface 146 of the first member 112 (e.g., the convex surface) can have a shape corresponding to the concave surfaces 144 and 142. When the extension chute 64 is assembled, the outwards facing surface 146 of the first member 112 can directly contact, engage, abut, etc., the concave surface 144 and 142 of the first structural member 106 and the second structural member 108, respectively.

The first structural member 106 can include an edge or periphery 134 and the second structural member 108 can similarly include an edge or periphery 136. The second member 114 defines a first edge or periphery, shown as first flanged end 130 at the first end 102, and a second edge or periphery, shown as second flanged end 132 at the second end 104. The first flanged end 130 and the second flanged end 132 of the second member 114 may be configured to abut, engage, contact, etc. (e.g., directly) the edge 134 of the first structural member 106 and the edge 136 of the second structural member 108 when the extension chute 64 is assembled. In some embodiments, the first member 112 has an overall longitudinal length that is greater than an overall longitudinal length of the second member 114. In this way, the first member 112 may extend along an entire longitudinal length of frame 110, whereas the second member 114 extends a longitudinal distance between the edge 136 of the second structural member 108 and the edge 134 of the first structural member 106.

Referring generally to FIGS. 4-10, the extension chute 64 can have a generally converging shape along the longitudinal axis 128 from the first end 102 to the second end 104. For example, the extension chute 64 may define a semi-circular volume or cross-sectional area that decreases from the first end 102 to the second end 104.

As shown in FIGS. 4-10, the first member 112 and the second member 114 are molded to the frame 110. The first member 112 and the second member 114 sandwich the frame 110 therebetween without the use of mechanical fasteners. The first member 112 and the second member 114 can be bonded with each other (e.g., using an adhesive) or may be structurally bonded with each other (e.g., integrally formed). For example, the first member 112 and the second member 114 can be thermoplastics (or any other plastic material that becomes softer when heated) that are heated, assembled on frame 110, and allowed to cool so that the first member 112 and the second member 114 bond with each other. The first member 112 and the second member 114 can be bonded with each other, with frame 110 sandwiched therebetween, using a twin-sheet thermoforming process. Other chutes may use mechanical fasteners to attach a plastic liner, which can result in failure of the liner. Advantageously, the first member 112 and the second member 114 are bonded to each other without the use of mechanical fasteners, thereby facilitating a robust and lightweight chute, while reducing a likelihood of mechanical failure due to fasteners and reducing a need for fasteners.

In some embodiments, the first member 112 includes an additional wear surface, or an additional layer along the concave surface 126. Advantageously, the additional wear surface or the additional layer can facilitate improved wear resistance of the extension chute 64 to the concrete or the slurry material. If an additional layer is used to facilitate wear resistance, the additional layer can be bonded with the concave surface 126 of the first member 112 (e.g., using an adhesive or heating the first member 112 and installing the additional layer).

Referring to FIGS. 13-17, another embodiment of the extension chute 64, shown as extension chute 200 includes a frame 210, and a first member 212 (e.g., a shell, a curved planar member, a plastic insert, etc.). The extension chute 200 can be a composite chute that includes the frame 210 manufactured from a rigid material such as metal, steel, etc., and the first member 212 that is manufactured from a plastic material. The frame 210 can be similar to the frame 110 but may include one or more additional members.

Figure 13:
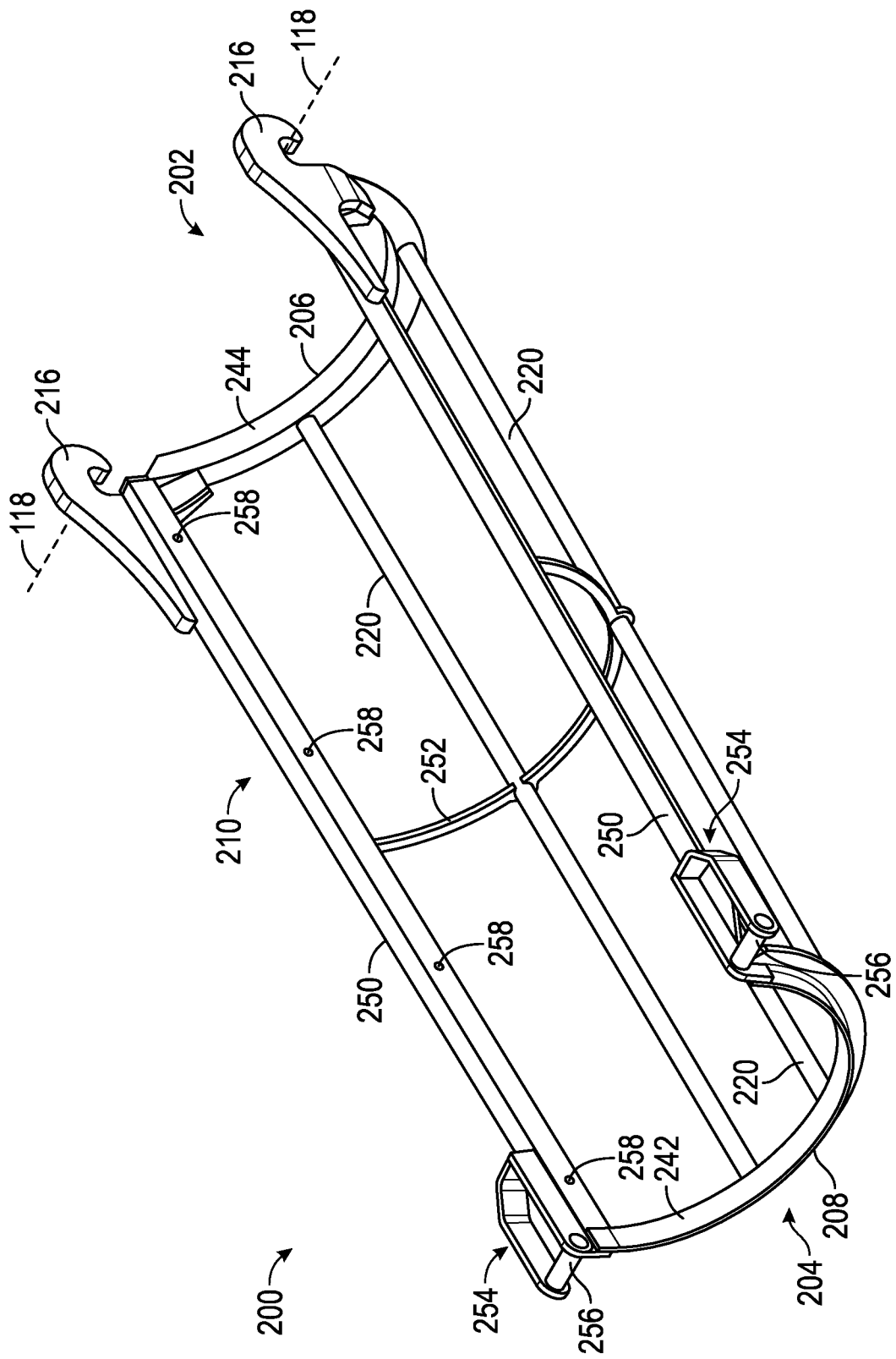
FIG. 13 is a perspective view of a frame of a composite concrete chute, according to another embodiment.
Figure 15:
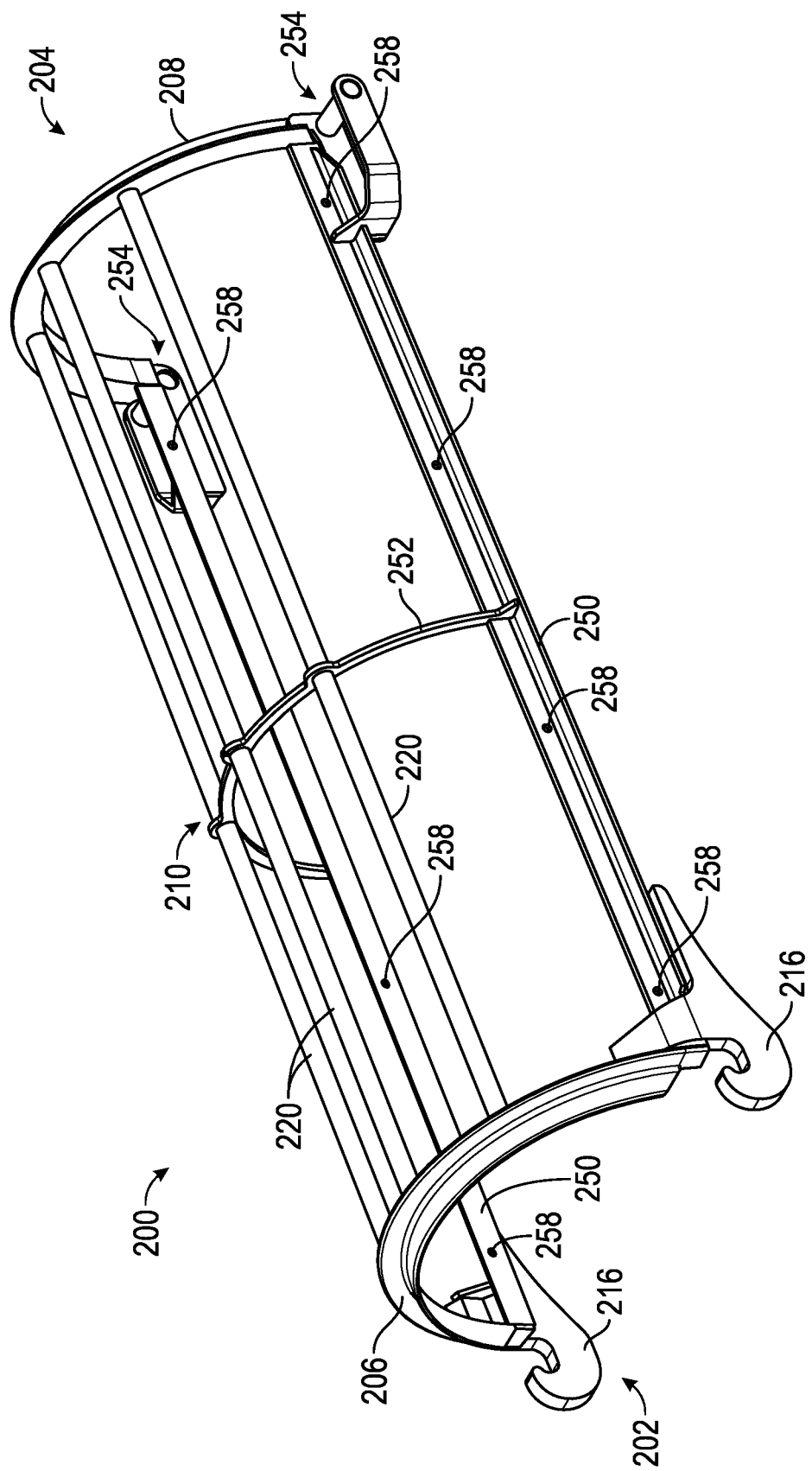
FIG. 15 is a bottom perspective view of the frame of the composite concrete chute of FIG. 13, according to an exemplary embodiment.
Figure 17:
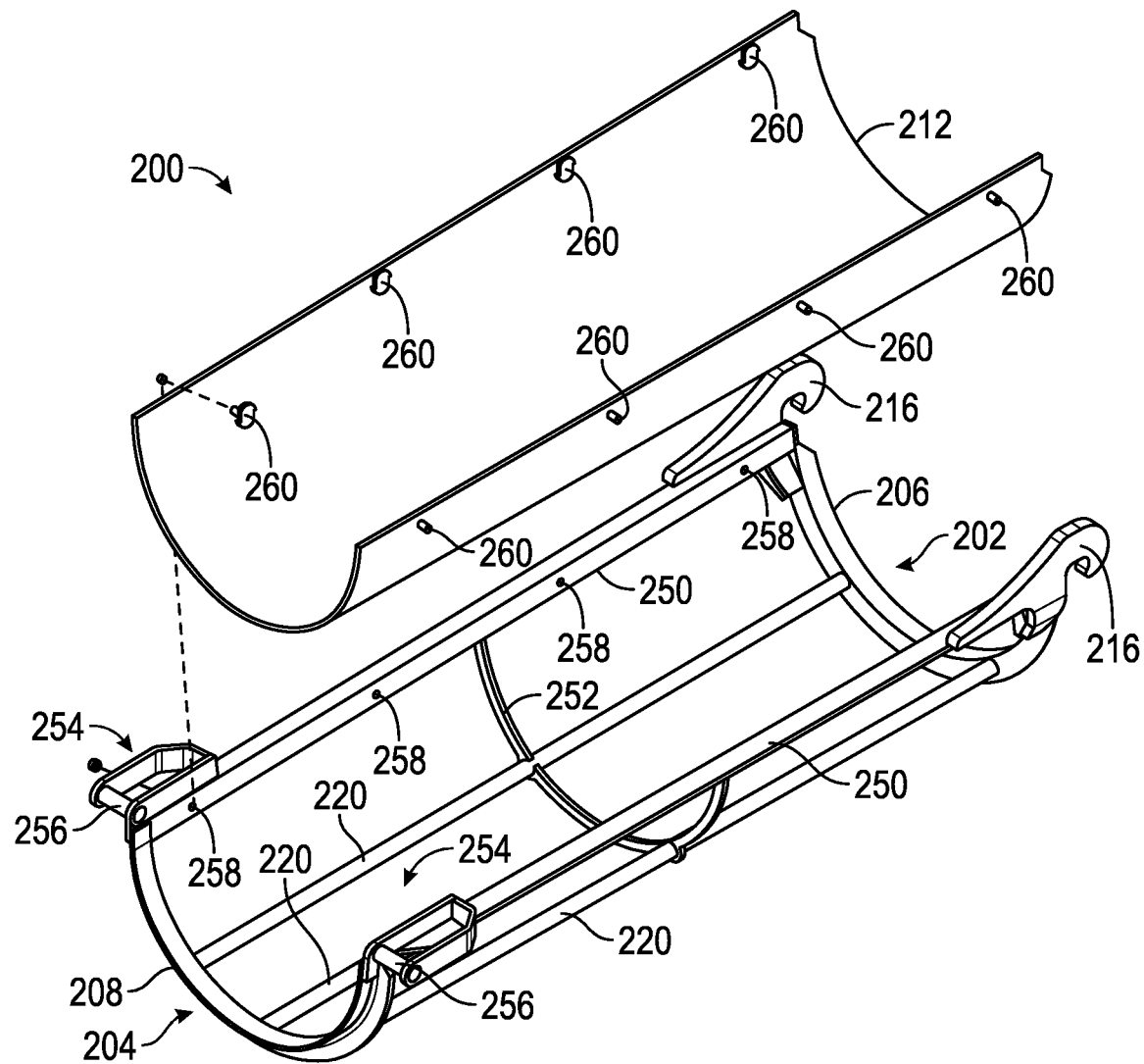
FIG. 17 is a perspective exploded view of the composite concrete chute of FIGS. 13-16, according to an exemplary embodiment.

As shown in FIGS. 13, 15, and 17, the frame 210 includes a first structural member 206 (e.g., the same as or similar to the first structural member 106 of the extension chute 64) that defines a first end 202 of the extension chute 200, and a second structural member 208 that defines a second end 204. The first structural member 206 and the second structural member 208 are positioned a distance apart and define the ends of the extension chute 200. The first structural member 206 and the second structural member 208 can have semi-circular or curved shapes that have different radii, diameters, circumference, etc. For example, the second structural member 208 that defines the second end 204 may have a smaller radius than a radius of the first structural member 206 that defines the first end 202.

The frame 210 includes multiple elongated members extending between the first structural member 206 and the second structural member 208, shown as elongated frame members 250, and rods 220 (e.g., cylindrical members, etc.). The elongated frame members 250 and the rods 220 can provide structural support between the first structural member 206 and the second structural member 208. The elongated frame members 250 can be fixedly coupled with opposite ends of each of the first structural member 206 and the second structural member 208. Opposite ends of each of the rods 220 can be received within the first structural member 206 and the second structural member 208. The rods 220 may provide additional structural support between the first structural member 206 and the second structural member 208. The first structural member 206 includes a surface 244 and the second structural member 208 includes a surface 242, both of which may be parallel or substantially parallel with a sheet 212 that is configured to rest upon or directly engage the surfaces 244 and 246 of the first structural member 206 and the second structural member 208.

As shown in FIGS. 13-17, the elongated frame member 250 includes an array of openings 258 (e.g., threaded openings, etc.) that are disposed along inwards facing surfaces of the elongated frame members 250. The extension chute 200 also includes a pair of coupling members 254 that are positioned at an end of the elongated frame members 250. The coupling members 254 each include a pin 256 that can be received within hooks 216 of an opposite end of an adjacent extension chute 200 or other chute. The hooks 216 are positioned at an opposite end of the elongated frame members 250 proximate the first structural member 206, and the coupling members 254 are positioned at the opposite end proximate the second structural member 208.

The extension chute 200 also includes a support member 252 that is positioned between the first structural member 206 and the second structural member 208. The support member 252 extends in an arcuate shape between the elongated frame members 250 and fixedly couples with each of the rods 220. The support member 252 can provide additional structural support for the frame 210. In some embodiments, multiple support members 252 are provided along a length of the frame 200 to provide additional structural support.

Figure 14:
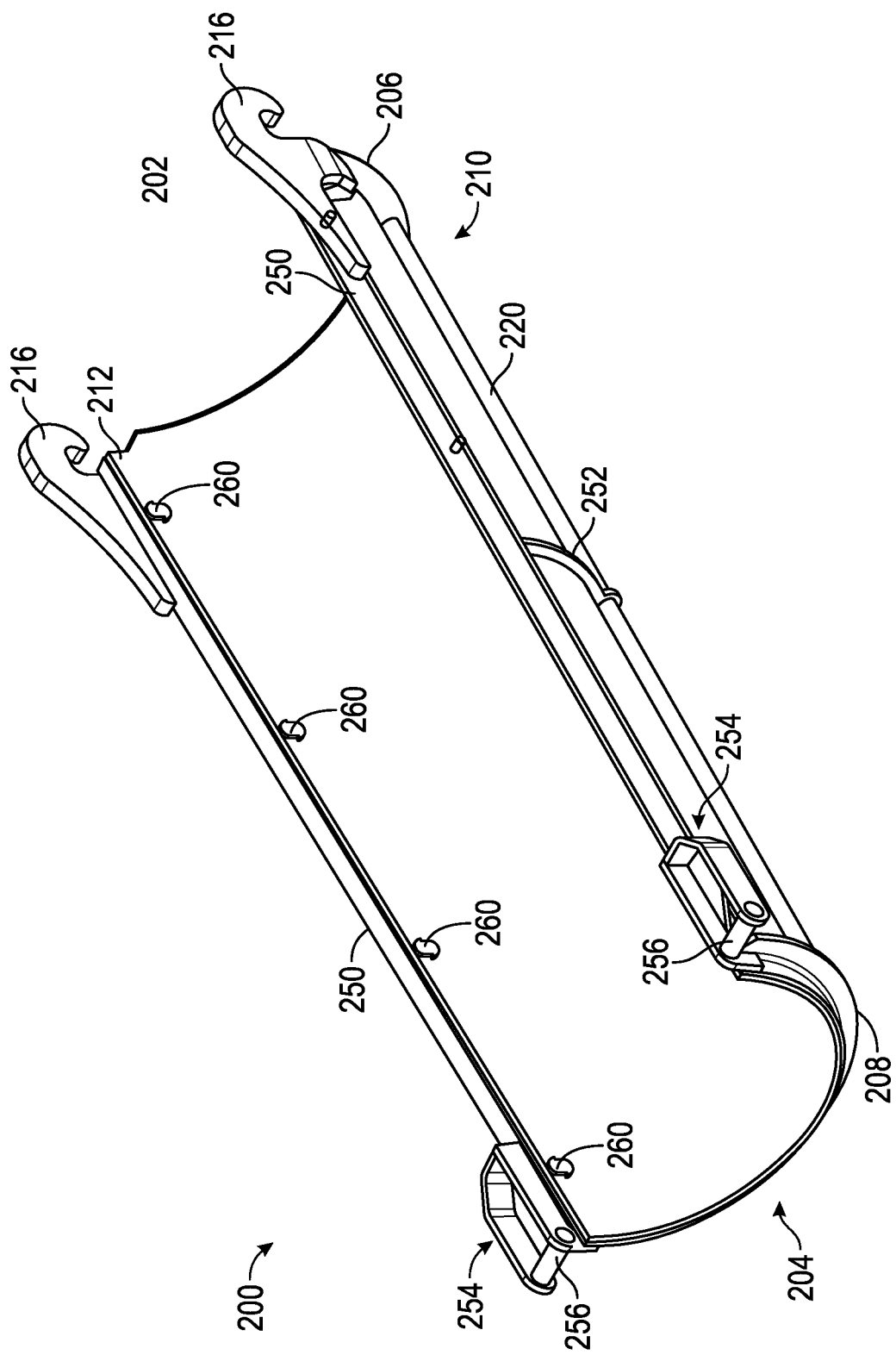
FIG. 14 is a perspective view of the frame of the composite concrete chute of FIG. 13 assembled with a shell, according to an exemplary embodiment.
Figure 16:
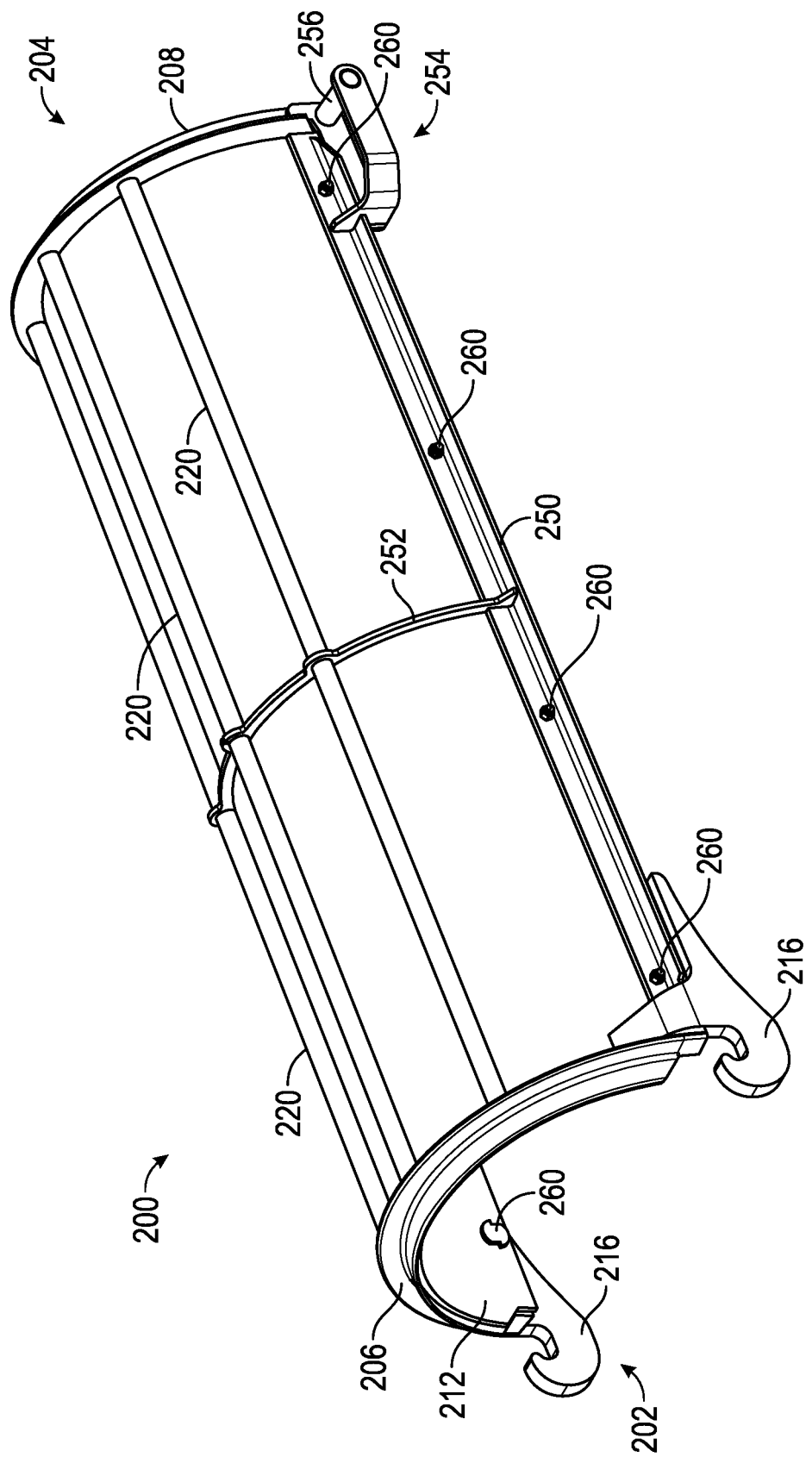
FIG. 16 is a bottom perspective view of the frame of the composite concrete chute of FIGS. 13 and 15 assembled with the shell of FIG. 14, according to an exemplary embodiment.

Referring particularly to FIGS. 14, 16, and 17, the frame 210 is configured to receive the member 212 to provide the assembled extension chute 200. The extension chute 200 includes a single member 212 that is placed on top of the frame 210 (as shown in FIGS. 14 and 16) instead of first member 112 and the second member 114 of the extension chute 64. The extension chute 200 includes the support member 252 that can provide additional structural support so that the extension chute 200 can be implemented with only one of the members 212 (e.g., on the top side).

Referring to FIG. 14, the member 212 may be bonded and/or fastened with the frame 210. The member 210 can include an array of openings that align with the openings 258 of the elongated frame members 250. Fasteners 260 can be passed through the openings of the member 210 and threaded with the threads of the openings 258 to thereby secure the member 212 with the frame 210. Advantageously, the extension chute 200 provides a chute that may be interlocked (e.g., in place of the extension chute 64), without requiring two of the members 212. Further, multiple of the extension chutes 200 can be coupled in series (e.g., by interlocking the hooks 216 with the coupling members 254 of the extension chutes 200).

Advantageously, the embodiment of the extension chute 64 as described with reference to and shown in FIGS. 4-12 uses the first member 112 and the second member 114 that may be integrated with the frame 110 to reduce an overall weight of the extension chute 64 and facilitate a light weight extension chute. The embodiment of the extension chute 200 as described with reference to and shown in FIGS. 13-17 uses the sheet 212 on only one side of the frame 210 and facilitates an extension chute 200 that can be more easily disassembled (e.g., by removing the fasteners 260) to facilitate ease of replacement of the sheet 212.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A composite chute for a commercial vehicle, the composite chute comprising:
    a metal frame assembly defining a longitudinal axis, the metal frame assembly comprising:
        a first structural member having an arcuate shape and positioned at a first end of the composite chute;
        a second structural member having an arcuate shape and positioned at a second end of the composite chute; and
        a plurality of elongated members extending between the first structural member and the second structural member along the longitudinal axis and fixedly coupled with the first structural member and the second structural member; and
    a pair of plastic sheets extending along the longitudinal axis and positioned on either side of the metal frame assembly, wherein the metal frame assembly is sandwiched between the pair of plastic sheets, wherein the pair of plastic sheets comprise:
        a first plastic sheet positioned on a first side of the metal frame assembly; and
        a second plastic sheet positioned on a second side of the metal frame assembly;
        wherein the first plastic sheet defines a concave surface of the composite chute, the concave surface configured to guide a slurry material along the composite chute;
        wherein the second plastic sheet comprises a plurality of ribs extending in a longitudinal direction along the second plastic sheet, wherein each of the plurality of ribs define a channel configured to receive a corresponding one of the plurality of elongated members of the metal frame assembly.

2. The composite chute of claim 1, wherein the pair of plastic sheets are bonded with each other with the metal frame assembly positioned between the pair of plastic sheets.

3. The composite chute of claim 1, wherein the pair of plastic sheets are manufactured from a thermoplastic material.

4. A concrete mixer vehicle comprising:
a chassis;
a plurality of tractive elements coupled with the chassis;
a mixer drum coupled with the chassis; and
a composite chute configured to facilitate discharge of a slurry material from the mixer drum, the composite chute comprising:
 a metal frame assembly defining a longitudinal axis, the metal frame assembly comprising:
  a first structural member having an arcuate shape and positioned at a first end of the composite chute;
  a second structural member having an arcuate shape and positioned at a second end of the composite chute; and
  a plurality of elongated members extending between the first structural member and the second structural member along the longitudinal axis and fixedly coupled with the first structural member and the second structural member; and
 a pair of plastic sheets extending along the longitudinal axis and positioned on either side of the metal frame assembly, wherein the metal frame assembly is sandwiched between the pair of plastic sheets, wherein the pair of plastic sheets comprise:
  a first plastic sheet positioned on a first side of the metal frame assembly; and
  a second plastic sheet positioned on a second side of the metal frame assembly;
  wherein the first plastic sheet defines a concave surface of the composite chute, the concave surface configured to guide a slurry material along the composite chute;
  wherein the second plastic sheet comprises a plurality of ribs extending in a longitudinal direction along the second plastic sheet;
  wherein each of the plurality of ribs define a channel configured to receive a corresponding one of the plurality of elongated members of the metal frame assembly.

5. The concrete mixer vehicle of claim 4, wherein the pair of plastic sheets are bonded with each other with the metal frame assembly positioned between the pair of plastic sheets.

6. The concrete mixer vehicle of claim 4, wherein the pair of plastic sheets are manufactured from a thermoplastic material.

7. A composite chute for a concrete mixer assembly, the composite chute comprising:
a metal frame assembly; and
a pair of plastic sheets positioned on either side of the metal frame assembly, wherein one of the pair of plastic sheets comprises a plurality of ribs extending in a longitudinal direction along the one of the pair of plastic sheets, each of the plurality of ribs defining a channel configured to receive a corresponding one of a plurality of elongated members of the metal frame assembly.

8. The composite chute of claim 7, wherein the pair of plastic sheets are bonded with the metal frame assembly.

9. The composite chute of claim 7, wherein the metal frame assembly comprises:
a first structural member having an arcuate shape and positioned at a first end of the composite chute;
a second structural member having an arcuate shape and positioned at a second end of the composite chute;
the plurality of elongated members extending between the first structural member and the second structural member in the longitudinal direction and fixedly coupled with the first structural member and the second structural member; and
an intermediate structural member having an arcuate shape and positioned between the first end and the second end of the composite chute, the intermediate structural member fixedly coupled with each of the plurality of elongated members.

10. The composite chute of claim 9, wherein the plurality of elongated members are received within openings of the first structural member and the second structural member.

11. The composite chute of claim 7, wherein at least one of the pair of plastic sheets define a concave surface, the concave surface configured to guide a slurry material along the composite chute.

12. The composite chute of claim 7, wherein the metal frame assembly further comprises a pair of hooks positioned on the metal frame assembly proximate a first end of the composite chute.

13. The composite chute of claim 12, wherein the metal frame assembly further comprises a pair of coupling members positioned proximate a second end of the composite chute, the coupling members configured to interlock with a pair of hooks of an adjacent composite chute.

14. The composite chute of claim 7, wherein the metal frame assembly is sandwiched between the pair of plastic sheets.

15. The composite chute of claim 7, wherein the pair of plastic sheets comprise a thermoplastic material.

16. The composite chute of claim 7, wherein the plurality of ribs each comprise a plurality of openings.

17. The composite chute of claim 7, wherein the plurality of elongated members comprise rods.

18. The composite chute of claim 7, wherein the plurality of elongated members comprise three elongated members.

19. The composite chute of claim 7, further comprising a plurality of fasteners configured to couple at least one of the pair of plastic sheets with the metal frame assembly.

20. The composite chute of claim 7, wherein the one of the pair of sheets comprises a flanged end.

* * * * *